Dec. 1, 1964     P. L. CREASE ETAL     3,159,094
COOKING DEVICE

Original Filed Feb. 21, 1962     3 Sheets-Sheet 1

INVENTORS
PIERRE L. CREASE
BY EARL E. SUTTON

, ATTORNEYS

Dec. 1, 1964 — P. L. CREASE ETAL — 3,159,094
COOKING DEVICE
Original Filed Feb. 21, 1962 — 3 Sheets-Sheet 2

INVENTORS
PIERRE L. CREASE
BY EARL E. SUTTON

ATTORNEYS

Dec. 1, 1964  P. L. CREASE ETAL  3,159,094
COOKING DEVICE

Original Filed Feb. 21, 1962  3 Sheets-Sheet 3

INVENTORS
PIERRE L. CREASE
BY EARL E. SUTTON

ATTORNEYS

United States Patent Office 3,159,094
Patented Dec. 1, 1964

3,159,094
COOKING DEVICE
Pierre L. Crease, Akron, and Earl E. Sutton, Mansfield, Ohio, assignors to Dominion Electric Corporation, a corporation of Ohio
Continuation of application Ser. No. 174,766, Feb. 21, 1962. This application July 2, 1963, Ser. No. 293,569
9 Claims. (Cl. 99—340)

Our invention relates to cooking devices adapted for alternatively cooking food from a heat source above and from a heat source below the food to be cooked.

This application is a continuation of application Serial No. 174,766, filed February 21, 1962, now abanboned.

An object of our invention is to provide an improved device of this class which is readily adaptable for either a broiling operation wherein the heat source is above the food or a baking or frying operation wherein the heat source is below the food.

Another object of the present invention is the provision of a cooking device constructed for easy and ready conversion so as to locate electric heating means above the food in a cooking compartment, or below the food in a cooking compartment, as desired.

Another object of the present invention is the provision of an improved construction in a cooking device readily adapted for universal use and readily transportable, and readily invertible to alternative cooking positions.

Other objects and a fuller understanding of this invention may be had by referring to the following description and claims, taken in conjunction with the accompanying drawings, in which:

In FIGURE 3 the view is looking in the opposite direction from that of the view shown in FIGURE 2 so as to illustrate the opposing inner wall of the compartment;

Figure 1:
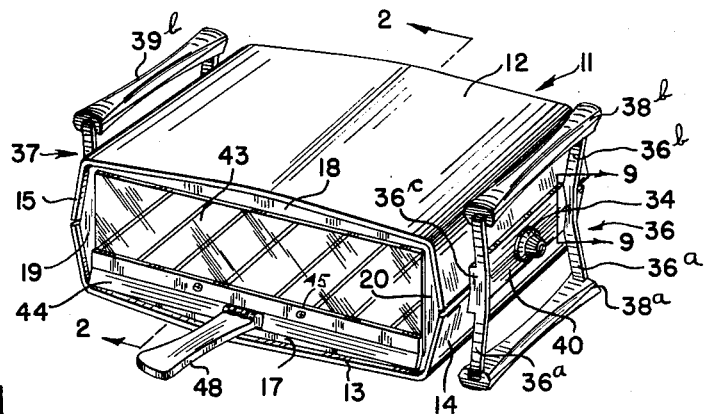
FIGURE 1 is a perspective view looking down on a preferred form of our cooking device.

Our cooking device has a compartment denoted generally by the reference character 11 which is adapted to be supported on a supporting surface 10 such as a table top. The compartment 11 has two spaced and horizontally disposed walls 12 and 13 defining a cooking space therebetween. In the position of the compartment in FIGURES 1, 2, and 4, the wall 12 is the uppermost wall and the wall 13 is the lowermost wall. In FIGURE 3 the compartment has been inverted so that the wall 12 is lowermost and the wall 13 is uppermost.

Joining the opposite ends of the walls 12 and 13 are vertical walls 14 and 15 enclosing the open cooking space. The walls 14 and 15 are formed by downwardly extending flange portions bent from the upper and lower walls. Joining the rear edges of the upper and lower walls 12 and 13 and the vertical end walls 14 and 15 is a rear wall 16. Thus the walls 12, 13, 14, 15 and 16 together form an open-ended compartment.

At the open end of the compartment there is connected to the walls thereof and framing the open end a rectangular frame made up of a ledge piece 17 and a ledge piece 18 along the opposite horizontal sides of the compartment and vertical edge piece 19 and vertical edge piece 20 disposed along the vertical end walls of the compartment. The rectangular frame made up of pieces 17, 18, 19 and 20 provides a smooth and contoured entrance to the interior of the compartment. Mounted within the compartment is a supporting frame made up of oppositely disposed side frame pieces 21 and 22 joined at the rear with a rear frame piece 23 and interconnected at their bottom edges by a bottom frame piece 24. This suporting frame made up of pieces 21, 22, 23 and 24 is adapated to provide support within the compartment for the heating element used as a heating source and for a rack member used for supporting food in the compartment.

The side frame piece 21 has bent over edge portions along its opposite edges which provide a slide surface 21a along one edge and a slide surface 21b along its opposite edge. Similarly, the side frame piece 22 has its opposite portions bent to form a slide surface 22a along the one edge and a slide surface 22b along the opposite edge thereof. These slide surfaces provide supporting surfaces upon which a rack member may be supported and slid therealong in moving the rack member in and out of the compartment. The slide surfaces 21a and 22a provide ane alternative support for a rack member and the slide surfaces 21b and 22b provide another alternative support for a rack member. The respective slide surfaces are disposed toward each other, that is, for example, slide surface 21a is disposed in opposition to slide surface 21b on one side of the compartment.

Spaced from the slide surface 21a and near the front of the compartment is a pin 25a and spaced from the slide surface 21b near the front of the compartment is a pin 25b. The pins define a space or slideway intermediate the pins and the adjacent slide surfaces. Spaced slightly from the side surface 22a and near the front of the compartment is a pin 26a and similiarly spaced from the slide surface 22b near the front of the compartment is a pin 26b. The several pins are supported by the compartment and have their axes disposed in horizontal planes, pin 25a being in axial alignment with pin 26a and pin 25b being in axial alignment with pin 26b.

Figure 5:
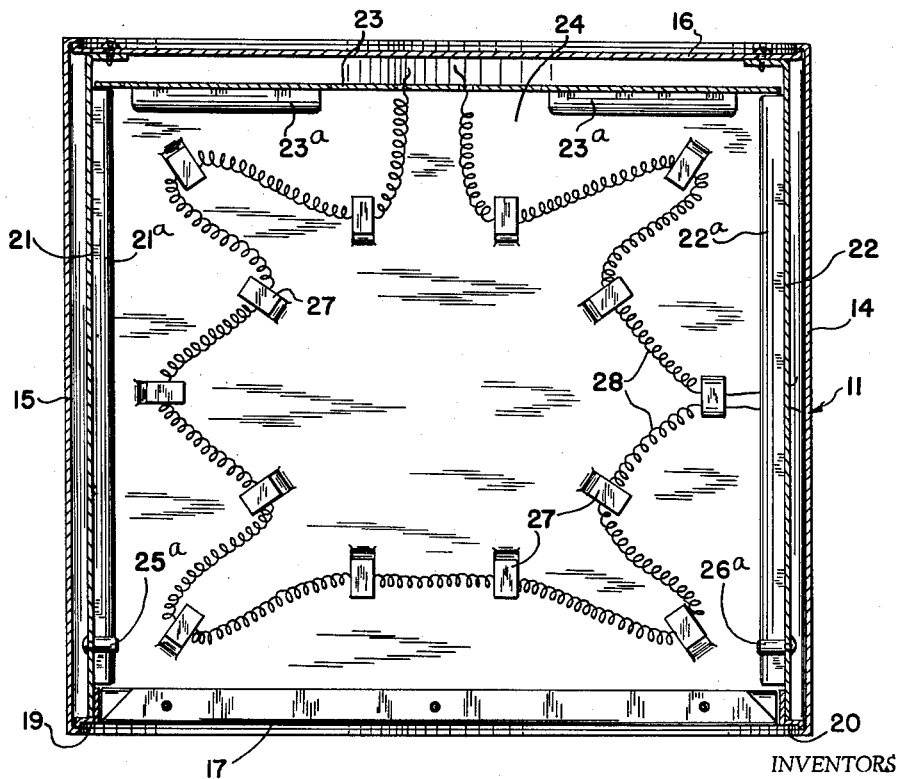
FIGURE 5 is a cross-sectional view looking downward upon the bottom portion of our device and looking in the direction of the arrows 5—5 of FIGURE 4.

An electric resistance heating element 28 made up of wire coil of appropriate electrical resistance material is carried in a zigzag path by insulating ceramic supports 27 upon the bottom frame piece 24 as illustrated in FIGURE 5. The element 28 is in electrical connection with a junction box 30 mounted on the rear wall 16 and extending from the junction box 30 are a pair of male prongs 31 protruding rearwardly from the compartment, the prongs 31 being guarded by a shield 29. Carried by the side frame piece 22 is a thermostatic and switch mechanism 32. The mechanism 32 is mounted by a screw bolt 33 to side piece 22 so as to expose the thermostat of mechanism 32 through an opening 22c in the side piece 22 to the heat within the compartment. A switch and thermostat control knob 34 extending outwardly from one end of the compartment is connected to the mechanism 32 so that by rotation of the knob 34 the thermostat may be set and the switch operated.

Disposed between the wall 13 and the bottom frame piece 24 which carries a heating element, there is disposed a heat-reflecting guard 35 made of metallic foil or other suitable material for reflecting heat from the electrical heating element 28 toward the interior of the compartment.

Connected to the compartment and disposed at the opposite ends thereof are arm members denoted generally by the reference characters 36 and 37, arm 36 being at one end of the compratment and arm 37 being at the opposite end of the compartment. Arm 36 is made up of similar metal pieces joined at their ends by elongated insulating pieces 38a and 38b. Extending in one direction is a portion 36a and extending in an opposite direction is a portion 36b which portions are joined by an intermediate portion 36c connected to the compartment.

Similiarly, the metal arm member 37 is made up of similar pieces at the front and rear of the compartment joined together by elongated insulating pieces 39a and 39b. Portion 37a of the arm member 37 and portion 37b of the arm member 37 extend in an opposite direction. Portions 37a and 37b being joined by a center portion 37c which is connected to the compartment.

Thus, the portions 36b of the arm member at one end joined together by the insulating piece 38b together provide a U-shaped bracket. Similarly, the portions 36a joined together by the insulating piece 38a form a U-shaped bracket, these U-shaped brackets extending in opposite directions from a horizontal plane taken through the center of the compartment. Similarly, the arm member 37 at the other end of the compartment is made up of U-shaped brackets, the base of each U being formed by an insulating piece.

Figure 2:
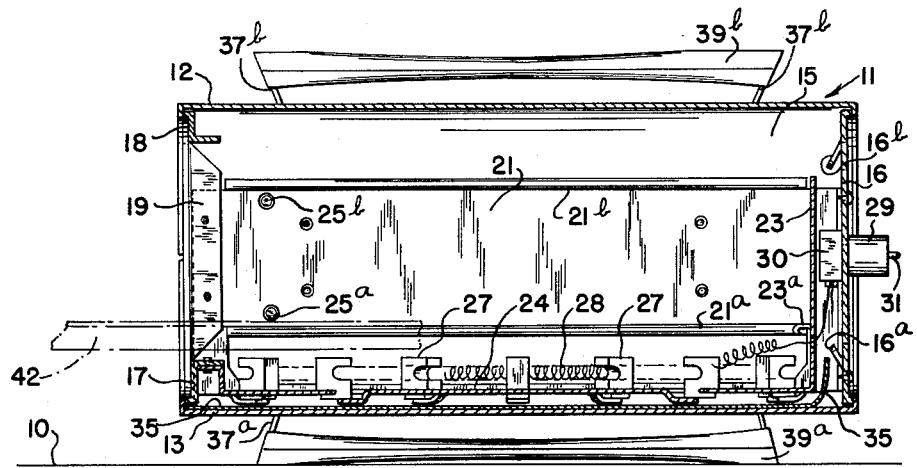
FIGURE 2 is a longitudinal sectional view through our cooking device and taken along the line 2—2 of FIGURE 1.
Figure 3:
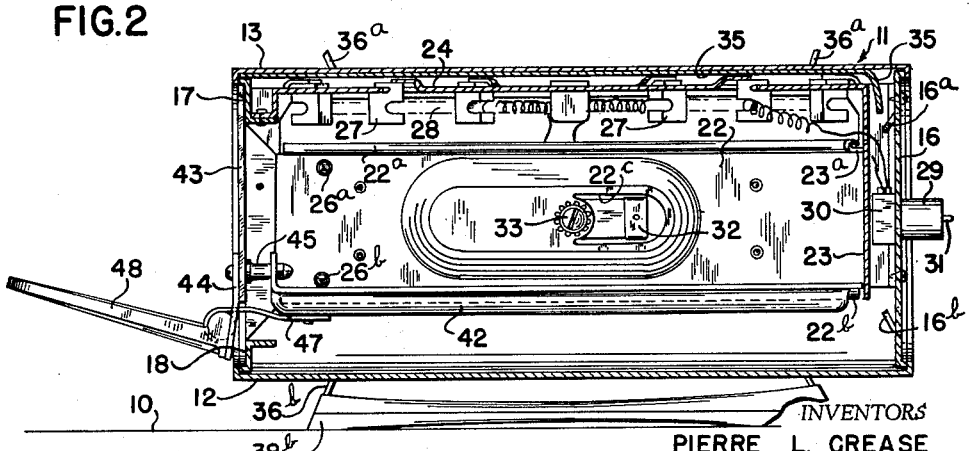
FIGURE 3 is another longitudinal sectional view taken through our device and after the same has been inverted to position the heating elements in an uppermost location as distinct from the lowermost location shown in FIGURE 2.
Figure 4:
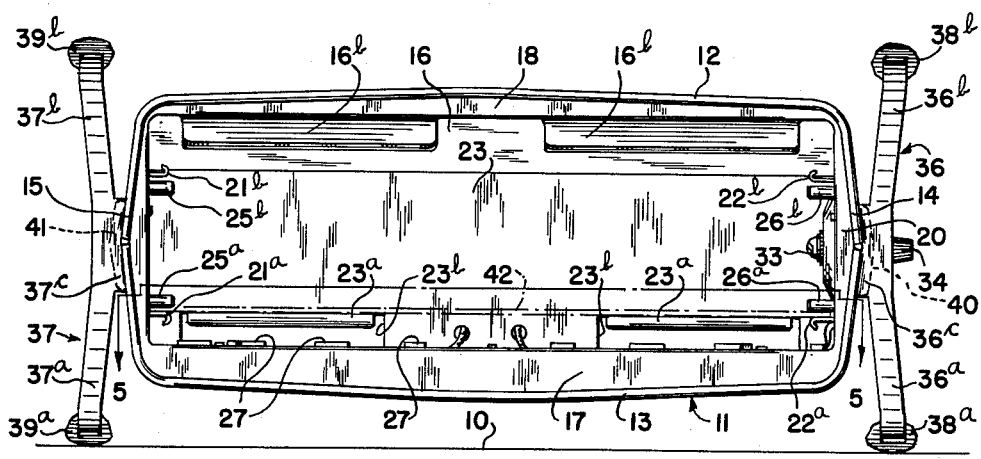
FIGURE 4 is an elevational front view of our cooking device.

When the compartment is in the cooking position illustrated in FIGURES 1, 2, and 4, then the insulating pieces 38a and 39a engage a supporting surface 10, such as a table top, and in this position the portions 36a and 37a of the respective arm members provide supporting legs for the compartment. In the same position, the portions 36b and 37b extending upwardly and joined by insulating pieces 38b and 39b provide handles for the ready lifting, tilting and inversion of the compartment. The compartment may be readily tilted and rocked from one position to the other alternative position by manually seizing the handles provided and rolling or tilting the compartment over to its opposite alternative position.

Figure 9:
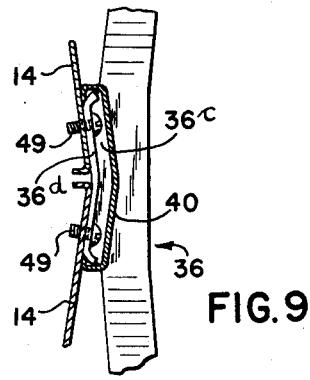
FIGURE 9 is a detailed sectional view showing the mounting of a supporting arm to a side of the compartment.

The intermediate portions 36c and 37c are connected to the compartment by means of bent-over ear portions 36d and 37d, respectively, and screw bolts 49. In FIGURE 9, which is an enlarged sectional view taken through line 9—9 of FIGURE 1, there is shown the detail of mounting arm member 36 to the compartment to the end wall 14 at a rearward location. The ear portion 36d is secured by the screw bolts 49 to the two portions making up end wall 14. By such connection at locations forwardly and rearwardly on opposite ends of the compartment, the upper and lower shell portions of the compartment are held together and the arm members secured thereto. Metal channel members 40 and 41 resiliently snap over and embrace the ear portions 36d and 37d, respectively, to cover the described connections.

The thermostat and switch control knob 34 extends through the channel piece 40 at the one end of the compartment where it may be manipulated in either of the alternative positions of the compartment.

There is provided a rack member 42 for supporting food in cooking position within the compartment. This rack member 42 has opposite parallel edge portions which are adapted to slide along and be supported upon either slide surfaces 21a and 22a or alternatively upon slide surfaces 21b and 22b. The edge portions of the tray member interfit between the slide surfaces and the respective pins slightly spaced therefrom, for example, as seen in FIGURE 4. The edge of the rack member engages in a sliding fit on one side between sliding surface 21a and pin 25a and on the other side between sliding surface 22a and pin 26a. The pins help retain the rack member in position against tilting downwardly when the rack member is in its withdrawn position. Supported upon the rack member 42 and carried thereby is a grill portion 42a of suitable wire mesh. The rack member 42 is adapted to support food to be cooked either within the lower pan surface of the rack member or upon the removable grill portion 42a.

Secured to the front edge portion of the rack member 42 is a glass shield 43 which is secured thereto by suitable nut and bolt assemblies 45 whereby the shield 43 is held substantially at right angles to the plane of the rack member 42. Also secured to the rack member by the nut and bolt assemblies 45 is a metal skirt 44 of rectangular shape which extends downwardly from the glass shield 43. The glass shield 43 and the metal skirt 44 together substantially fill the opening to the interior of the compartment when the rack is located in its innermost position within the compartment.

Figure 6:
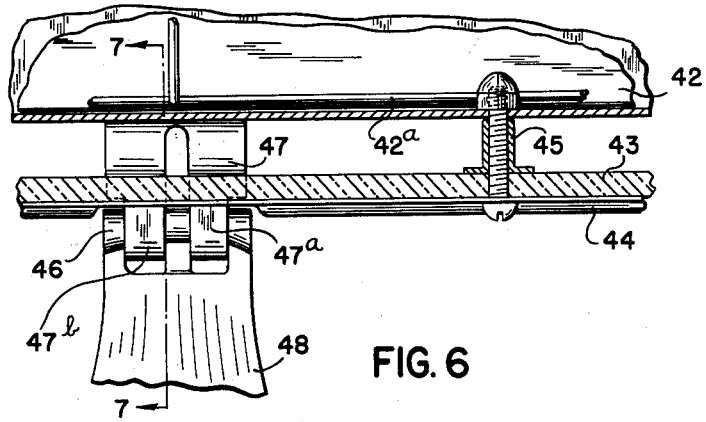
FIGURE 6 is an enlarged sectional view showing detail of the rack member and of a handle mounted thereto.
Figure 7:
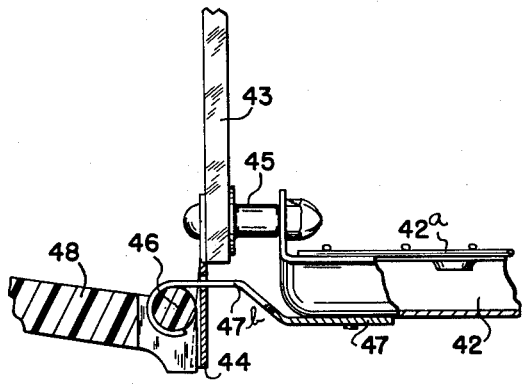
FIGURE 7 is an enlarged sectional view looking in the direction of the arrows 7—7 of FIGURE 6 and showing the handle in its lowermost position.
Figure 8:
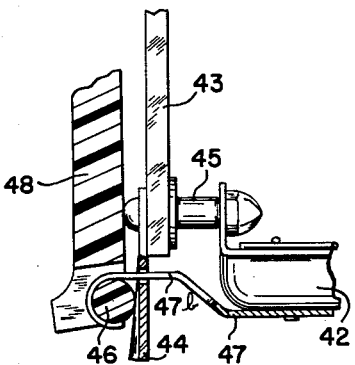
FIGURE 8 is a view similar to that of FIGURE 7 but showing the handle in its uppermost position.

A handle member 48 is connected to the rack member 42 by a suitable hinge mechanism 46. A leaf spring 47 secured to the rack member 42 has split fingers 47a and 47b which resiliently press down upon the handle 48 at the hinge 46 so as to maintain the handle 48 either in the lowermost position shown in FIGURES 6 and 7 or in the uppermost position illustrated in FIGURE 8. Tension of the spring 47 tends to hold the handle in either of its two alternative positions. By having the handle 48 inclined upwardly as shown in FIGURE 8, the cooking device may be more readily stored or packed for shipment.

It thus becomes apparent that by means of our improved cooking device the compartment may be readily converted to alternative positions whereby in one position the heating element is uppermost and in the other alternative position the heating element is lowermost. The cooking device may be readily manipulated and moved to its alternative positions by the disposition and arrangement of the arms at the opposite ends thereof which provide both support means and handle means. The rack member may be supported on the then lowermost longitudinal slides provided by the slide surfaces, such as slide surfaces 21a and 22a in FIGURE 4. Thus with the parts positioned in FIGURE 4 with the heating element lowermost and the rack member immediately above the heating element, the cooking device may be used for baking, for frying or other cooking operations wherein it is desired to have the heat below the food to be cooked. By removing the rack member and inverting the cooking device to its other alternative position, and then reinserting the rack member to be supported on the then lowermost slide surfaces 21b and 22b, then the arrangement is such that the heating element is uppermost and disposed over the food being supported on the rack member therebelow. It is to be noted that although the compartment itself is inverted so as to place the heating element uppermost or lowermost, the level of the rack member remains substantially the same as it is supported upon the lowermost of the slide surfaces carried by the compartment. Except for the insulating members carrying the heating element and for the heat insulating members on the arms 36 and 37, and the insulating parts of the switch and thermostat mechanism and associated with the wire circuit of the system, and also except for the glass shield 43 and the handle 48 of heat insulating material, the cooking device is preferably made of metal such as aluminum, stainless steel and the like.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A cooking device comprising the combination of a cooking compartment having opposite first and second oppositely disposed and spaced walls adapted to be horizontally disposed in the operating positions of the cooking device, opposite third and fourth oppositely disposed and spaced walls connecting the ends of said first and second sides providing end walls for said cabinet, a fifth side connecting ends of said first, second, third and fourth walls to form five walls defining an open-ended compartment, an electric heating element mounted to said compartment and disposed within the compartment, said heating element being disposed closer to the first of said walls than to the second of said walls, a first pair and a second pair of oppositely disposed parallel supporting sideways carried by said compartment for supporting a rack member therein, said first pair of slideways being disposed closer to the first of said walls than to the second of said walls, and said second pair of slideways being disposed closer to the second of said walls than to the first of said walls, a rack member adapted to support food to be cooked and movable through the open end of said compartment along a said pair of slideways to be supported thereon, said rack member including a door member carried at an end thereof and disposed substantially at right angles thereto for substantially closing said open end of the compartment upon moving the rack member into the said compartment, said pairs of slideways being disposed in said compartment to support the said rack member on the pair of slideways positioned nearest the bottom-most wall of said first and second walls disposed horizontally, and supporting members connected to the cabinet adjacent its opposite ends for supporting the compartment above a surface, each of said supporting members comprising a pair of oppositely extending U-shaped brackets joined at their adjacent ends to the opposite ends, respectively, of the compartment and having the respective bases of the U-shaped brackets formed of heat-insulating material, each said pair of U-shaped brackets at their said adjacent ends having bent-over ear portions extended alongside of, and secured to, an end wall of the compartment, and including a channel member embracing the said bent-over ear portions of the U-shaped brackets at each end of the cabinet, said bases of the brackets at each end of the compartment being disposed in substantially the same plane, said supporting members extending in opposite directions from the respective planes of said first and second walls to alternately support the compartment on said surface with the first of said walls disposed bottom-most and with the second of said walls disposed bottom-most, the arrangement providing that the cooking device may be readily inverted to dispose either of the first and second walls bottom-most and to dispose the said heating element alternately adjacent the uppermost and adjacent the bottom-most of said first and second walls to be correspondingly above or below the rack member supported on the pair of slideways adjacent the then bottom-most of said first and second walls.

2. A cooking device comprising a compartment having oppositely spaced first and second walls horizontally disposed in the cooking operation of the device and having end walls and a back wall joining said spaced walls to form said compartment having an open end, each said end wall comprising a first portion integral with said first wall and a second portion integral with said second wall, the juncture of said portions being intermediate the planes of said first and second walls, an electric heating element mounted within said compartment relatively adjacent said first wall and spaced from said second wall, a first pair of oppositely disposed track members in a first plane, a second pair of oppositely disposed track members in a second plane spaced from said first plane, said first and second planes being substantially parallel to each other and to said first and second walls, the track members of each pair having rack-supporting surfaces disposed to face rack-supporting surfaces of the respective track members of the other pair of track members, a rack member insertable into said compartment through said open end and adapted to support food to be cooked, said rack member being supportable on the rack-supporting surfaces of the then lowermost pair of track members, a closure member carried by said rack member to be positioned at said open end of the compartment upon insertion of the rack member into said compartment, supporting members carried by and extending from said compartment outwardly from said first and second spaced walls in opposite directions to support said compartment above a surface in alternate positions of either the said first and second spaced walls being directed lowermost, each of said supporting members comprising a pair of oppositely extending U-shaped brackets joined at their adjacent ends to the opposite ends, respectively, of the compartment and having the respective bases of the U-shaped brackets formed of heat-insulating material, the said U-shaped brackets at said joined adjacent ends at each end of the cabinet having ear portions angularly disposed to the legs of the brackets and extended toward each other generally parallel to, and alongside of, the respective end wall to span said juncture, said ear portions being joined to the said first and second portions of each end wall to secure the same together, and longitudinal members embracing said ear portions and disposed between the legs of the brackets along the said juncture, said bases of the brackets at each end of the compartment being disposed in substantially the same plane, the compartment in one of said alternate positions disposing the said heating element above the rack member supported on the lowermost pair of said track members and in the other of said alternate positions disposing the heating element below the rack member supported on the lowermost pair of said track members.

3. A cooking device comprising a compartment having oppositely disposed walls defining a cooking space therebetween, said walls being adapted to be disposed substantially horizontally in the cooking operation of the device, each of said oppositely disposed walls having inturned end portions registering with the inturned end portions of the other of said oppositely disposed walls to provide end walls of the compartment, an electric heating element carried by the compartment within said open space in a plane substantially parallel to said walls, said heating element being disposed substantially closer to a first of said walls than to a second of said walls, a rack member adapted to support on its upper surface food to be cooked in said cooking space, a first pair and a second pair of parallel rail members carried by said compartment to support said rack member in said open space, said pairs of rail members being spaced apart and each pair of rail members having supporting surfaces disposed toward supporting surfaces of the other pair of rail members whereby said rack member may be supported upon the supporting surfaces of the lowermost pair of rail members in said cabinet, supporting members carried by and extending from said compartment at the opposite ends thereof, each of said supporting members comprising a pair of oppositely extending U-shaped brackets joined at their adjacent ends to the opposite ends, respectively, of the compartment intermediate of said first and second walls and having the respective bases of the U-shaped brackets formed of heat-insulating material, said brackets intermediate the bases thereof having joining portions disposed along the respective end wall of the cabinet and connected to the registered inturned end portions of said oppositely disposed walls to secure the same assembled, and elongated members extended between the legs of joined brackets and disposed over said joining portions to substantially cover the same, said bases of the brackets at each end of the compartment being disposed in substantially the same plane, one bracket of each pair of joined brackets extending in a downward direction from said compartment for supporting the compartment on a surface engaged by the base of the bracket, and the other bracket of each pair of joined brackets extending in an upward direction from said compartment for the base of the bracket to provide handle means for lifting the compartment and for tilting the compartment to invert the same, the inversion of said compartment reversing the locations of said first and second oppositely spaced walls one above the other, and thereby shifting the elevation of said heating element related to the then lowermost of said walls, reversing the locations of said pairs of rail members one above the other, and thereby shifting the disposition of the pairs of rail members to support the rack member on the then lowermost pair of rail members, and reversing the locations of said brackets and thereby supporting the compartment on the then downwardly directed brackets, the rack member on the lowermost pair of rail members supporting food below the heating element in one position of the compartment and above the heating element in an inverted position of the compartment.

4. A cooking device invertible to alternate positions wherein the food to be cooked is supported above the heat source in one of said alternate positions and below the heat source in the other of the alternate positions, comprising in combination, an open-ended compartment defining a cooking source for receiving food to be cooked, said compartment having spaced walls one of which is disposed lowermost and the other is disposed uppermost in each of said alternate positions of the cooking device, said spaced walls having flanged end portions disposed toward each other to form together end walls at the opposite ends of the compartment, an electric heating element carried by the compartment and disposed in said cooking space closest to one of said walls and farthest from the other of said walls, a rack member adapted to support food to be cooked and positionable in said compartment intermediate of said spaced walls, rack-supporting means carried by said compartment for supporting said rack member, said rack-supporting means having oppositely disposed elongated supporting surfaces arranged to support the said rack member on the then uppermost of the supporting surfaces in the alternate positions of the cooking device and to permit parallel movement of said rack member therealong in being inserted into and withdrawn from the compartment, through the open end thereof, arm members carried by the compartment adjacent the opposite ends thereof, each of said arm members having a first portion, a second portion and a third portion, said first and second portions being similar and extending in substantially the same plane in opposite directions beyond the said spaced walls of the compartment, the said planes at the opposite ends of the compartment being parallel to each other, said third portion being disposed alongside and parallel to the general plane of the said end wall at the respective end and being joined to the flanged end portions at each of the respective ends to hold the flanged end portions together and the said spaced walls assembled, the outermost portions of the arm members at each end of the compartment being of heat-insulating material and disposed substantially parallel to each other in said plane, the then lowermost of the portions of the respective arm members being disposed to support said compartment on a horizontal surface and the then uppermost of the portions of the respective arm members being disposed above said compartment to provide handle means for lifting said device and for tilting said device to invert the same.

5. A cooking device as claimed in claim 4 and in which each of the said first and second portions of said arm members is of substantially in the shape of a U having a substantially flat base, the said heat-insulating material of the outermost portions of the arm members extending along said flat base.

6. A cooking device as claimed in claim 4 and including a shield carried by said rack member to obstruct the open end of the compartment upon the insertion of the rack member into the compartment.

7. A food cooking device invertable to opposite alternative positions in which the heat source is disposed above the food in one of the alternative positions and below the food in the opposite alternative position, comprising the combination of, a compartment having an open space for accommodating food to be cooked, said compartment having a first side and a second side spaced from each other to define said open space therebetween, the positions of said first and second sides one above the other being reversible upon the inversion of the cooking device to said alternate positions, said compartment including two opposed U-shaped sheet metal members, the bases thereof being disposed along said first and second sides, respectively, of the compartment and the end portions of the U-shaped sheet metal members being directed toward each other at the opposite ends of the compartment to form together end walls of the compartment, the juncture of the said end portions being disposed intermediate and parallel to the planes of said first and second sides of the compartment, arms extending outwardly in opposite directions and away from said first and second sides to provide alternately a support for the cooking device upon a surface below the compartment cooking device and a handle for the cooking device above the compartment, said arms at each end of the compartment having joining portions extended toward each other and overlying the juncture of the said end portions of the U-shaped sheet metal members, said joining portions being secured to the said end portions adjacent said juncture to hold the said U-shaped sheet metal members in assembled position, said arms at each end of the compartment being joined by heat-insulating portions disposed parallel to each other in the same plane, the heat-insulating portion carried at the opposite ends of the compartment and disposed in one of said opposite directions providing said support and the heat-insulating portion carried at the opposite ends of the compartment and disposed in the other of said opposite directions providing said handle, an electric heating element carried by the compartment and positioned in the open space relatively close to the first of said sides and relatively distant from the second of said sides for providing a heat source for cooking food in said open space, and slide rail means carried by the compartment and having oppositely parallel rack-supporting surfaces, some of said oppositely disposed surfaces being alternately directed upwardly and other of said oppositely disposed surfaces being directed downwardly in the alternative positions of said cooking device, and a rack member adapted to hold food to be cooked, said rack member being slidable on the then upwardly directed rack-supporting surfaces of said slide rail means, the arrangement of compartment, rail means and rack member being such that the rack member supported on the upwardly-directed surfaces is located below the heating element in the one alternative position of the cooking device and above the heating element in the other alternative position of the cooking device.

8. A food cooking device as claimed in claim 7 in which a transparent shield is carried by the rack member to obstruct passage of heat from the compartment upon the rack member being inserted in the compartment without obstructing the view of the interior of the compartment above said rack member.

9. A food-cooking device as claimed in claim 7 and including metallic cover members secured to said joining portions and extending along said juncture between said arms at each end of the compartment to cover said joining portions and said juncture between said arms.

References Cited by the Examiner
UNITED STATES PATENTS

| D. 194,200 | 12/62 | Crease | 99—340 |
| 1,903,477 | 4/33 | Rolfson | 99—339 |
| 1,955,867 | 4/34 | Wilkie et al. | 99—340 |
| 2,262,498 | 11/41 | Holm-Hansen | 99—341 |
| 2,893,307 | 7/59 | Rodriguez | 99—427 |

EUGENE R. CAPOZIO, *Primary Examiner.*

ROBERT E. PULFREY, *Examiner.*